Patented June 17, 1952

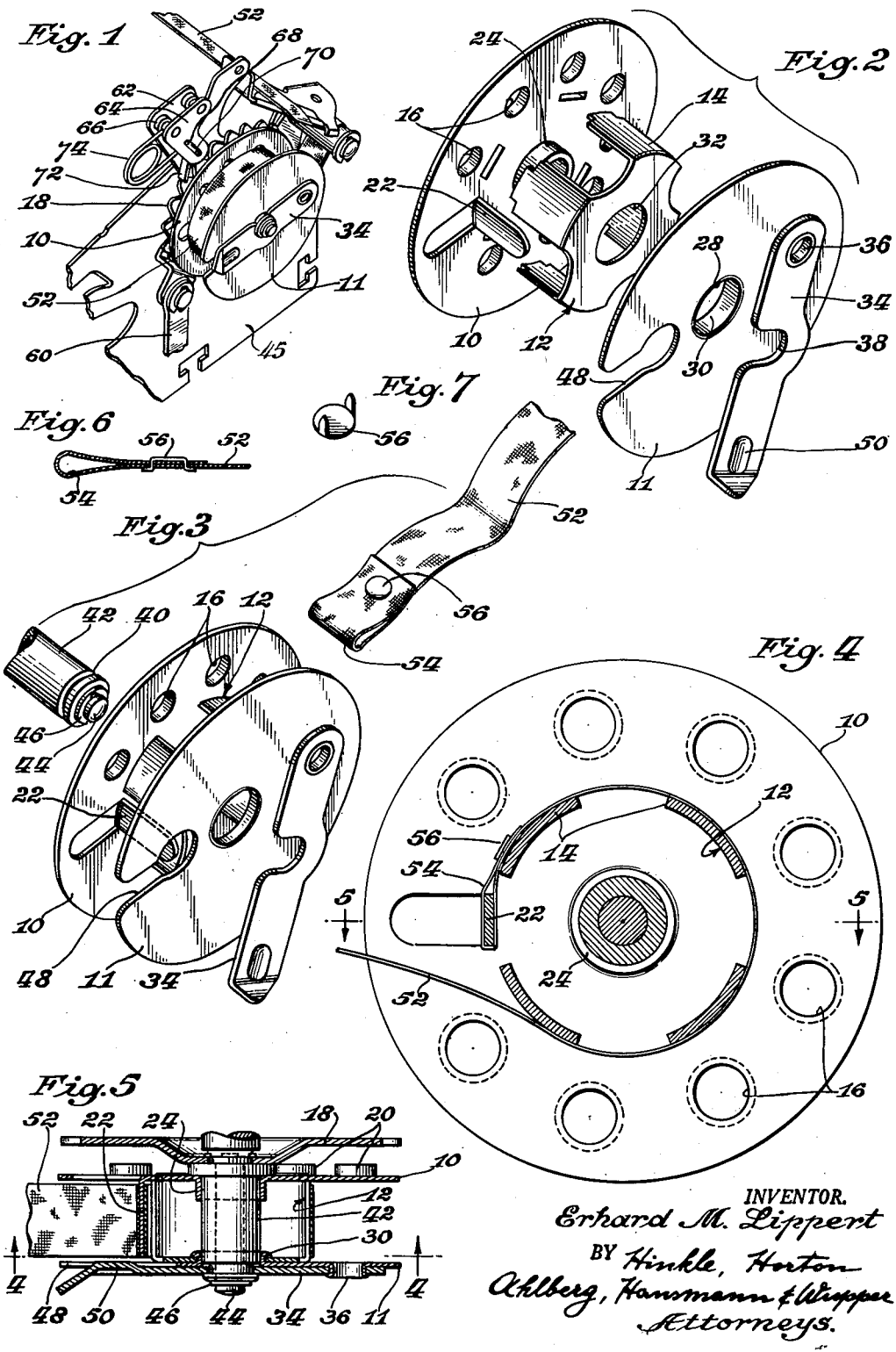

2,600,409

UNITED STATES PATENT OFFICE 2,600,409

INKING RIBBON SPOOL

Erhard M. Lippert, Chicago, Ill., assignor to Victor Adding Machine Co., Chicago, Ill., a corporation of Illinois Application April 28, 1949, Serial No. 90,078

3 Claims. (Cl. 242—74)

My invention relates generally to inking ribbon spools for use in adding machines, typewriters, and similar office machines and equipment.

It is usually an unpleasant task to change ribbons in office machines, particularly if the ribbon is very narrow so that the space between the flange of the spool upon which it is wound is not sufficiently wide to enable convenient manipulation of the end of the ribbon. As frequently made in the past, the ribbon had a hook riveted thereto, this hook engaging in a slot in the hub of the ribbon spool, or the hub of the spool was provided with prongs which were engaged by the ribbon. In replacing a ribbon, the operator endeavored to attach the end of the ribbon to the spool by placing it between the flanges of the spool and engaging the hook or prong. This was a time consuming finger soiling operation.

It is therefore an object of my invention to provide an improved ribbon spool in which the end of the ribbon may be easily attached to the hub of the spool by sliding the end of the ribbon laterally through a suitable slot or notch formed in one of the spool flanges, and to provide means for covering this slot by the device which locks the ribbon spool to the stud or shaft upon which it rotates.

Other objects will appear from the following description, reference being had to the accompanying drawings, in which Fig. 1 is a perspective view of the ribbon spool mounted upon a machine, such as an adding machine;

Fig. 2 is an exploded perspective view of the ribbon spool;

Fig. 3 is an exploded perspective view of the spool, the ribbon, and the stud upon which the spool is mounted, showing the manner in which these parts are assembled;

Fig. 4 is a sectional view, taken on the line 4—4 of Fig. 5, showing the manner in which the ribbon is wound upon the hub of the spool;

Fig. 5 is a diametrical cross sectional view, taken on the line 5—5 of Fig. 4;

Fig. 6 is a sectional view showing how the loop is formed and the rivet is attached in the end of the ribbon; and Fig. 7 is a perspective view of the type of rivet employed to form the loop in the end of the ribbon.

The spool comprises a pair of discs 10 and 11 joined by hub portion 12, the latter being a stamping comprising a plurality of legs 14 which are suitably staked to the disc 10. The disc 10 is provided with a plurality of pierced, flanged openings 16, for receiving a driving lug of an operating ratchet wheel 18. The disc 10 also has a ribbon anchoring ear 22 struck therefrom and extending inwardly in circumferential alignment with the legs 14 of the hub 12. The disc 10 also has a central opening surrounded by an inwardly turned bearing flange 24. The disc 11 is provided with a pierced central opening 28 surrounded by an inwardly extending flange 30. The flange 30 is inserted in a hole 32 formed at the center of the hub stamping 12.

A locking lever 34 is pivotally mounted on a pierced flange 36 and has a U-shaped notch 38 for engagement in an annular groove 40 formed in a sleeve 42 which is staked to and forms a hub for the ratchet wheel 18, the latter being freely rotatable on a stud 44 fixed to the frame plate 45 of the machine and being held thereon by a keeper 46.

The disc 11 is provided with a radial keyhole-shaped slot 48 extending inwardly from its periphery, this slot being located in alignment with the anchoring ear 22 of the disc 10. The locking lever 34 is provided with an indentation 50 which fits in the straight portion of the keyhole slot 48 to hold the lever in the position in which it is in locking engagement with the groove 40. The ribbon 52 for use with the spool which has been described, may be of conventional construction, except that the end thereof is formed into a loop 54 and secured by a two-prong rivet 56.

In attaching the ribbon to the spool, it will be readily apparent that the end of the ribbon may be slid through the keyhole slot 48 and the loop 54 slipped over the prong or ear 22, the operator thus being able very quickly and easily to attach the ribbon to the spool even though the space between the discs of the spool is so narrow that it would be difficult to secure the ribbon to the spool by conventional means. Furthermore, the ribbon anchoring ear 22 is visible through the enlarged portion of the keyhole slot 48 so that no difficulty is experienced in locating it and in slipping the loop 54 of the ribbon over it.

After the ribbon has been attached and the spool replaced upon the hub or sleeve 42, the ratchet wheel 18 and the lever are swung to locking position so that the indentation 50, as previously described, seats within the straight portion of the keyhole slot 48. In this position the projecting portion of the indentation 50 fills a portion of the slot 48 so that the ribbon will not scuff against the edges of the slot.

The spool is illustrated as being driven from a reciprocating link 60 which may be attached to any suitable operating part of the machine, this link being pivotally secured to a lever 62 having a small plate 64 secured thereto by shouldered rivets 66. The lever 62 and the plate 64 have aligned elongated slots 68 formed therein for the reception of the pivot ends 70 of a pawl 72, the pawl being held in engagement with the periphery of the ratchet wheel 18 by a wire spring 74, one end of which abuts one of the shoulder rivets 66 and the other end of which engages the pawl and forces it downwardly against the ends of the slots 70. This type of drive is well known and is reversible upon holding the ratchet wheel stationary. In this type of ribbon feeding mechanism, the ribbon unwinds from one spool to the other and then rewinds on the first spool in the opposite direction. This is done automatically, and the force required to shift the pawl 72 is transmitted as tension on the ribbon. It is therefore advantageous to have the end of the ribbon tightly secured to the spool in the manner disclosed herein. The reversal of the direction of the wind of the ribbon on the spool, and smooth winding, is facilitated by virtue of the fact that the loop 54 at the end of the ribbon 52 is sufficiently large that it may pivot freely about the anchoring ear 22.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. An inking ribbon spool comprising a plurality of assembled stampings including two side wall discs and a central hub part, one of said discs having an ear struck therefrom and extending inwardly in the region of the hub, the other of said discs having a slot extending radially inwardly from the periphery in alignment with the ear and having an outwardly extending hollow cylindrical projection opposite the slot, a locking lever pivoted on the cylindrical projection on said second disc and having a detent part engageable in said slot to hold the lever in locking position.

2. An inking ribbon spool comprising a plurality of sheet metal stampings including two side wall discs and a central hub part, the hub part comprising a plane portion secured to one of the discs and having a plurality of spaced arms secured at their ends to the other disc and defining a discontinuous cylindrical hub surface, one of the discs having an ear struck therefrom and extending adjacent the cylindrical surface defined by the arms and intermediate two of the arms, the other disc having a keyhole shaped slot extending inwardly from the periphery thereof and having its enlarged part in alignment with said ear, and a lever for locking the spool to an annularly grooved shaft, said lever being pivoted to said slotted disc and having a detent part cooperable with the slot in the disc when the lever is in locking position.

3. An inking ribbon spool comprising a plurality of sheet metal stampings including two side wall discs and a central hub part, the hub part comprising a plane portion secured to one of the discs and having a plurality of spaced arms secured at their ends to the other disc and defining a discontinuous cylindrical hub surface, each of said discs having a central opening surrounded by a sidewardly extending flange bearing part for engagement with a shaft, one of the discs having an ear struck therefrom and extending adjacent the cylindrical surface defined by the arms and intermediate two of the arms, the other disc having a keyhole shaped slot extending inwardly from the periphery thereof and having its enlarged part in alignment with said ear, and a notched resilient sheet metal lever for locking the spool to an annularly grooved shaft, said lever being pivoted to said slotted disc and having a detent part cooperable with the slot in the disc when the lever is in locking position to hold the lever against accidental displacement and thereby lock the spool against lateral movement on the shaft.

ERHARD M. LIPPERT.

REFERENCES CITED

The following references are of record in the file of this patent:

UNITED STATES PATENTS

| Number | Name | Date |
|---|---|---|
| 320,392 | Peterson | June 16, 1885 |
| 856,254 | Helmond | June 11, 1907 |
| 1,075,760 | Butler | Oct. 14, 1913 |
| 1,301,696 | Hess | Apr. 22, 1919 |
| 1,827,488 | Roach | Oct. 13, 1931 |
| 1,840,926 | Williams | Jan. 12, 1932 |
| 2,115,912 | Helmond | May 3, 1938 |
| 2,189,547 | Fischer | Feb. 6, 1940 |
| 2,483,528 | Christoff | Oct. 4, 1949 |

FOREIGN PATENTS

| Number | Country | Date |
|---|---|---|
| 673,012 | Germany | Mar. 14, 1939 |